May 11, 1943.　　　　P. C. LOMBARDINI　　　　2,318,789
WATERCRAFT
Filed May 23, 1942　　　　2 Sheets-Sheet 1
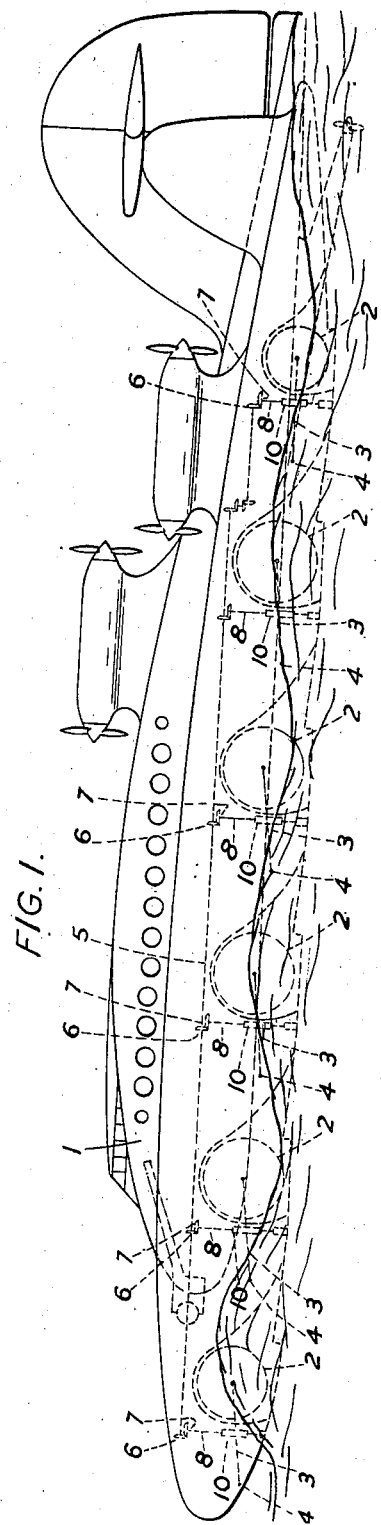
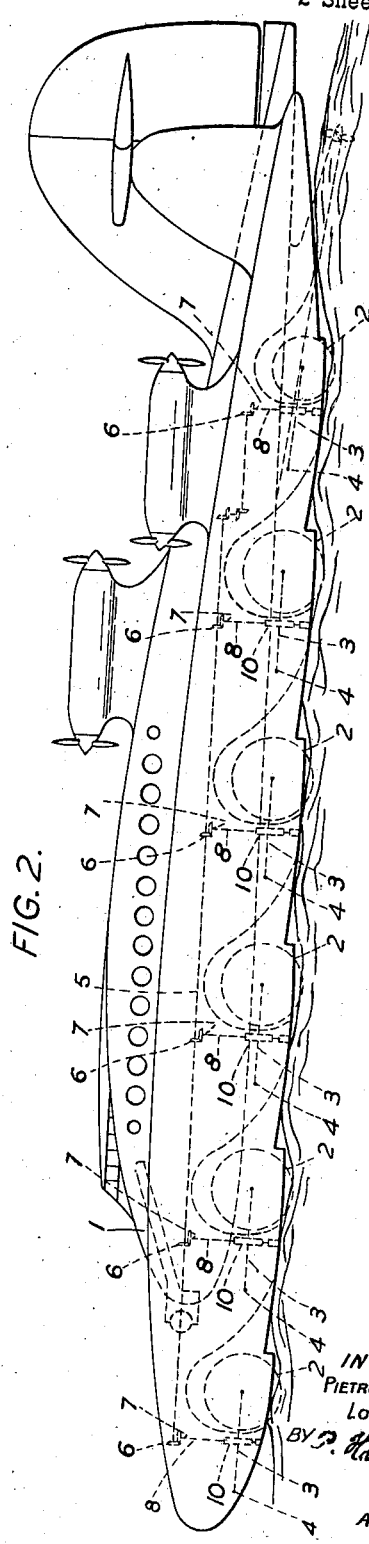
INVENTOR.
PIETRO CLEMENTE
LOMBARDINI.
BY P. Haddan
ATTORNEY.

May 11, 1943.  P. C. LOMBARDINI  2,318,789
WATERCRAFT
Filed May 23, 1942  2 Sheets-Sheet 2
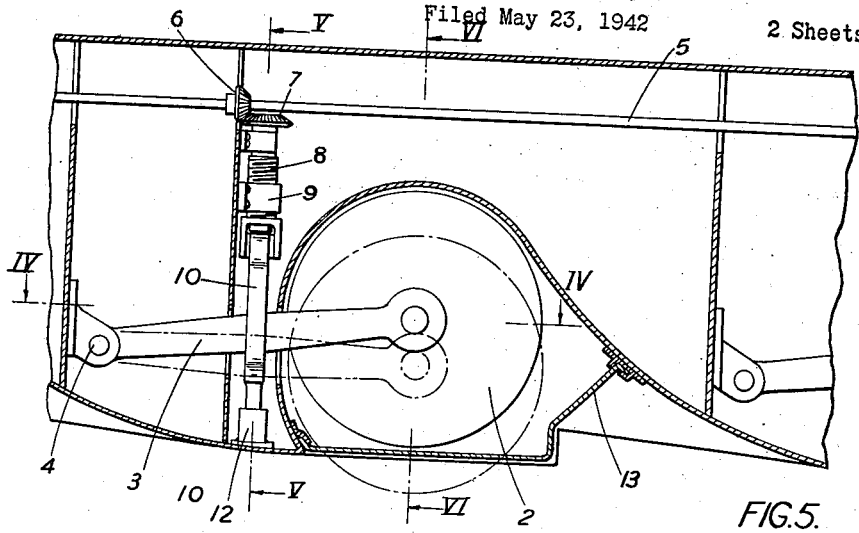
FIG.3.
FIG.4.
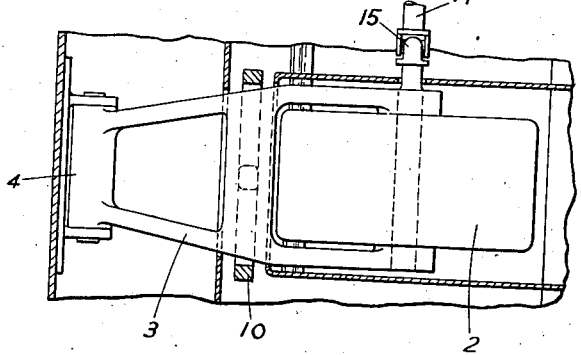
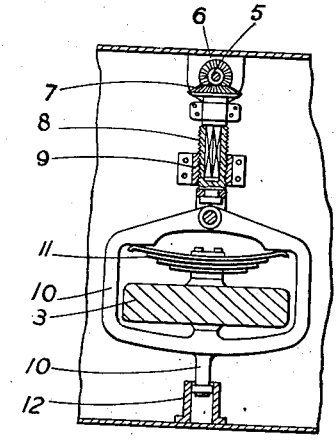
FIG.5.
FIG.6.
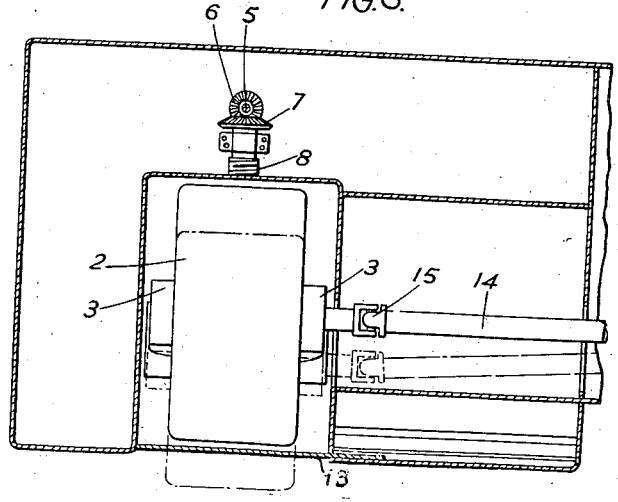
FIG.7.
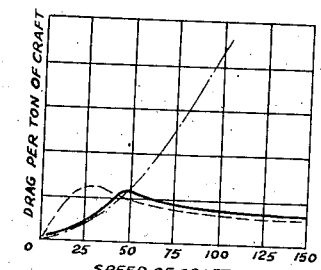
INVENTOR.
PIETRO CLEMENTE LOMBARDINI.
BY
ATTORNEY.

Patented May 11, 1943

2,318,789

UNITED STATES PATENT OFFICE 2,318,789

WATERCRAFT

Pietro Clemente Lombardini, Frosterley, England

Application May 23, 1942, Serial No. 444,230
In Great Britain February 4, 1941

5 Claims. (Cl. 114—67)

This invention relates to water craft of the kind comprising a buoyant body or bodies adapted to float on water and having planing surfaces, and rollers, wheels or drums mounted to rotate on horizontal axes arranged transversely to the direction of travel of the vessel and adapted to be partially immersed in the water, the direction of rotation of the said rollers being the same as that in which the craft is propelled. An example of such a craft is to be found in my U. S. patent specification No. 1,924,949.

I have found that at the lower speeds up to a critical speed—about 50 miles per hour—the rollers actually hinder the planing effect of the craft, so that the power-speed ratio is increased, although above this speed the ratio rapidly falls off as the speed increases, and extremely high speeds are attainable with comparatively little power. However, it is highly desirable to eliminate this drawback and so produce more rapid and efficient initial acceleration of the craft. It is the object of this invention to provide means whereby this desideratum may be attained in a simple and inexpensive manner.

According to the invention means are provided whereby the rollers may be retracted from the water and projected thereinto when desired.

With craft of the kind described in the above specification, means may be provided for closing the apertures from which the rollers project when in use, so that the planing surface of the craft is practically unbroken.

With such an arrangement, from stationary up to the critical speed at which the effect of the hydro-roller system becomes positive, the said rollers are held retracted to enable the optimum planing conditions for the body of the craft to obtain. At or about the critical speed of the craft the rollers are gradually lowered and rotated to the required speed—which is a peripheral speed at least equal to that of the craft—until the rollers only are in contact with the surface of the water.

Means may be provided whereby the retracting and projecting of the rollers may be effected automatically according to the speed of the craft. For example, a speedometer may be arranged to operate a switch in the circuit of a motor controlling the retraction and projection of the rollers, at the desired speed.

The invention will now be described by way of example with reference to the accompanying drawings.

In the said drawings:

Fig. 1 is an elevation of an air-screw driven watercraft according to the invention travelling at low speed.

Fig. 2 is a similar view to Fig. 1, but shows the craft travelling at high speed.

Fig. 3 is a partial view in elevation to an enlarged scale showing the mounting of one of the rollers.

Fig. 4 is a partial plan view of Fig. 3 showing the roller and its frame only.

Fig. 5 is a section on the line V—V of Fig. 3 and shows the roller frame mounting only.

Fig. 6 is a section on the line VI—VI of Fig. 3.

Fig. 7 is a graph showing the comparison of different planing systems.

Referring more particularly to the drawings, 1 indicates the hull of the craft which has a stepped planing bottom, 2 the rollers, 3 forked frames on which the said rollers are mounted, and 4 pivotal bearings about which the said forks are pivotally mounted. Extending throughout the length of the hull 1 is a motor driven control shaft 5 on which are rigidly mounted bevel wheels 6 which mesh with other bevel wheels 7 each of which (Figs. 3 and 5) is slidably splined to the upper end of a worm shaft 8 engaging in a stationary nut 9. The shaft 8 is pivotally connected at its lower end to an enclosed yoke 10 arranged about the fork 3, a spring 11 being interposed between the upper portions of the said yoke and fork, while the lower portion of the yoke is constrained in its movement by means of a downward extension 10a which is a sliding fit in a sleeve 12.

Lateral slides 13—which follow the contour of the stepped bottom of the craft—provide extra planing surface when the rollers are retracted. Then, to obviate as much as possible the drag due to the roller cavities, the after portions of the said cavities are finished off with downward and rearwardly directed convex curves, and the forward portions with similarly directed concave curves.

The rollers are driven by means of Cardan shafts 14 and universal joints 15, either from a common shaft driven from the main engines or by individual engines or electric motors.

In operation, when the craft is to be started from rest, the shaft 5 is operated to raise the rollers 2 by means of the yokes 10 which abut against the lower portion of the forks 3, and the slides 13 are slid out laterally to close the roller cavities and give the maximum planing surface. The main engines are then started, and the craft begins to move, occupying the position relative to the water line approximately as shown in Fig. 1, When the craft is travelling at about 50 M. P. H., the slides 13 are retracted; the rollers are speeded up to a peripheral speed corresponding to a speed which approximates that at which the craft is travelling; and then the shaft 5 is operated to lower the rollers 2 into the water. The main engines and rollers are then speeded up until the craft is travelling at top speed at which it will occupy a position relative to the surface of the water as shown in Fig. 2.

The theory of the present invention will be readily understood by a reference to the graph shown in Fig. 7 in which the vertical ordinates indicate drag per ton of craft, and the horizontal ordinates the speed of the craft. The dotted line curve is the characteristic of a watercraft with non-retractable rollers; the chain dotted line is the characteristic of the ideal planing surface, by which is meant the hull shape of a surface water craft which will give the maximum theoretical efficiency at a predetermined speed, or in other words, will cause minimum drag and the full line curve is the characteristic of the watercraft in which the rollers are retractable and have in fact been retracted while the craft has been accelerating up to 50 M. P. H., and then on attaining this speed, lowered. In other words, by using the retractable rollers in the manner described, the most efficient portions of the ideal planing surface characteristic and the fixed roller watercraft characteristic are combined, and rapid and efficient initial acceleration of the watercraft are obtained.

The invention enables relatively light craft of large dimensions and high speed to be made at a relatively low cost, and it is therefore ideal for such craft as aircraft carriers which owing to the high mobility of the craft can take elusive action against attack, and have the further advantage that runways are not necessary for the aeroplanes to take off from; for by making the watercraft cruise at a speed of between 50 and 60 M. P. H.—that necessary for lifting of the aircraft—the latter merely remain stationary until the said speed is attained when they are released and soar vertically from the deck of the carrier.

For ocean-going craft the length of the craft will be about 1000 feet to enable the craft to ride on the high waves. For calmer water such as coastal waters or river estuaries smaller craft may be made, and such will be very effective in carrying out submarine chasing and rescue work, their high speed making it practically impossible for a submarine to get away out of the range of depth charges once it has been spotted.

The rollers serve the further purpose of facilitating beaching on sandy or shingly or other relatively smooth beaches; for, as they project beyond the bottom of the craft when projected, they will contact the ground and support the craft therefrom. Hence landing and embarking of troops and equipment may be carried out under such relatively unfavourable conditions without wetting and much more rapidly and safely than hitherto.

What I claim as my invention and desire to secure by Letters Patent of the United States is:

1. Watercraft comprising buoyant body means having a planing surface, cavities in said body means, rollers in said cavities, and means for retracting and projecting said rollers into and from said cavities.

2. Watercraft according to claim 1, including means for closing the cavities when the rollers are retracted thereinto.

3. Watercraft according to claim 1, wherein the rearward portions of the cavities are finished off with downwardly and rearwardly directed convex curves, and the forward portions of said cavities are finished off with similarly directed concave curves.

4. Watercraft according to claim 1, including forks pivotally mounted on said body means, the rollers being mounted between said forks, vertically movable yokes arranged about and adapted to abut against said forks, and means for controlling the vertical movement of said yokes whereby is effected the retraction and projection of the rollers.

5. Watercraft according to claim 1, including forks pivotally mounted on said body means, the rollers being mounted between said forks, vertically movable yokes arranged about and adapted to abut resiliently against said forks, and means for controlling the vertical movement of said yokes whereby is effected the retraction and projection of the rollers.

PIETRO CLEMENTE LOMBARDINI.